US012676382B2

(12) United States Patent　　(10) Patent No.:　US 12,676,382 B2
Lee et al.　　(45) Date of Patent:　Jul. 7, 2026

(54) BATTERY SYSTEM

(71) Applicant: SK ON CO., LTD., Seoul (KR)

(72) Inventors: Kang Gu Lee, Daejeon (KR); Hae Ryong Jeon, Daejeon (KR); Jun Hee Jung, Daejeon (KR)

(73) Assignee: SK On Co., Ltd., Seoul (KR)

( * ) Notice: Subject to any disclaimer, the term of this patent is extended or adjusted under 35 U.S.C. 154(b) by 794 days.

(21) Appl. No.: 18/102,768

(22) Filed: Jan. 30, 2023

(65) Prior Publication Data

US 2023/0261315 A1　　Aug. 17, 2023

(30) Foreign Application Priority Data

Feb. 17, 2022　(KR) ........................ 10-2022-0020959

(51) Int. Cl.
| | | |
|---|---|---|
| *H01M 50/383* | (2021.01) | |
| *H01M 10/653* | (2014.01) | |
| *H01M 50/211* | (2021.01) | |
| *H01M 50/271* | (2021.01) | |
| *H01M 50/291* | (2021.01) | |
| *H01M 50/293* | (2021.01) | |

(52) U.S. Cl.
CPC ....... *H01M 50/383* (2021.01); *H01M 10/653* (2015.04); *H01M 50/211* (2021.01); *H01M 50/271* (2021.01); *H01M 50/291* (2021.01); *H01M 50/293* (2021.01)

(58) Field of Classification Search
CPC ............. H01M 50/211; H01M 50/271; H01M 50/291; H01M 50/293; H01M 50/383; H01M 10/653
USPC ....................................................... 429/120
See application file for complete search history.

(56) References Cited

U.S. PATENT DOCUMENTS

| | | | |
|---|---|---|---|
| 2012/0183823 A1* | 7/2012 | Von Borck et al. | ........................ H01M 10/663 429/81 |
| 2012/0286706 A1 | 11/2012 | Ohkura | |
| 2014/0193685 A1 | 7/2014 | Lim | |
| 2018/0097211 A1 | 4/2018 | Choi et al. | |
| 2020/0099114 A1 | 3/2020 | Ryu et al. | |
| 2021/0028517 A1 | 1/2021 | Choi et al. | |

FOREIGN PATENT DOCUMENTS

| | | |
|---|---|---|
| JP | 2012-059383 A | 3/2012 |
| JP | 2019-204636 A | 11/2019 |
| KR | 10-2012-0106834 A | 9/2012 |
| KR | 10-1730961 B1 | 4/2017 |
| KR | 10-2018-0036863 A | 4/2018 |
| KR | 10-2019-0094921 A | 8/2019 |
| KR | 10-2021-0011642 A | 2/2021 |

OTHER PUBLICATIONS

Office Action for Korean Patent Application No. 10-2022-0020959 issued by the Korean Patent Office on Feb. 15, 2026.

* cited by examiner

*Primary Examiner* — Kevin P Kerns

(74) *Attorney, Agent, or Firm* — IP&T GROUP LLP

(57) ABSTRACT

A battery system includes a cell stack in which a plurality of battery cells are stacked; a module case accommodating the cell stack therein; and at least one blocking member interposed between the plurality of battery cells, wherein the blocking member is formed of a material that does not melt at 300° C. or less, and a cross-section of the blocking member is formed to have a shape in which a curve is repeated.

13 Claims, 8 Drawing Sheets

80

BATTERY SYSTEM

CROSS-REFERENCE TO RELATED APPLICATION(S)

This application claims benefit of priority to Korean Patent Application No. 10-2022-0020959 filed on Feb. 17, 2022 in the Korean Intellectual Property Office, the disclosure of which is incorporated herein by reference in its entirety.

BACKGROUND

1. Field

The present disclosure relates to a battery system improving safety.

2. Description of Related Art

Unlike a primary battery, a secondary battery can be charged and discharged, and thus can be applied to devices within various fields such as a digital camera, a mobile phone, a laptop computer, a hybrid vehicle, and an electric vehicle. Among secondary batteries, a large amount of research into a lithium secondary battery having high energy density and a high discharge voltage is in progress. The lithium secondary battery may be manufactured as a flexible pouch-type battery cell, a rigid prismatic-type battery cell, or a cylindrical can-type battery cell.

A plurality of battery cells may be stacked and mounted on a module case in a unit of a cell stack, electrically connected to each other, to form a battery system such as a battery module or a battery pack. Such a battery system may be installed and used in an electric vehicle or the like.

It is very important to secure safety of a battery system. In particular, when flames are generated in a battery cell due to an abnormal phenomenon and the flames propagate to other battery cells adjacent thereto, thermal runaway may occur, leading to additional ignition or explosion. Therefore, a structure capable of blocking spread of flames generated therein is required.

Referring to Korean Patent Application No. 2018-0014621, a flame propagation prevention member is disposed between battery cells to block the spread of flames. However, the structure disclosed in the above document considers only blocking of flames and does not consider swelling of a battery cell at all. Therefore, when a battery cell swells, appearance of the battery system may be deformed and the battery cell may also be subjected to strain.

Therefore, there is a demand for a battery system that considers expansion of a battery cell as well as blocking propagation of flames.

SUMMARY

An aspect of the present disclosure is to provide a battery system capable of blocking propagation of flames between battery cells and absorbing swelling of a battery cell, when an event such as ignition or explosion occurs in the battery system.

According to an aspect of the present disclosure, a battery system includes a cell stack in which a plurality of battery cells are stacked; a module case accommodating the cell stack therein; and at least one blocking member interposed between the plurality of battery cells, wherein the blocking member is formed of a material that does not melt at 300° C. or less, and a cross-section of the blocking member is formed to have a shape in which a curve is repeated.

The blocking member may be elastically deformed by pressure applied by a battery cell of the plurality of battery cells, when the battery cell expands, to protrude at least a portion of the blocking member out of the cell stack.

A plurality of air insulation layers may be provided between the battery cell and the blocking member, facing each other.

The battery system may further include a heat transfer member disposed between the module case and the cell stack, wherein at least a portion of the blocking member may be inserted into the heat transfer member.

The heat transfer member may be formed from at least one selected from the group consisting of thermal grease, a thermally conductive adhesive, and a heat dissipation pad.

The blocking member may have a cross-section formed in a sine wave shape.

The blocking member may have a cross-section formed in a square wave shape.

The blocking member may be formed such that all bent portions have an obtuse angle.

The blocking member may include mica.

The blocking member may be formed by mixing a mica particle and a silicone resin.

The module case may include an upper plate disposed on the cell stack, wherein the upper plate may have at least one insertion groove into which a portion protruding out of the cell stack is inserted, when the blocking member is elastically deformed.

The insertion groove may be formed to face the blocking member, and one or more blocking members are inserted into one insertion groove.

In addition, according to an aspect of the present disclosure, a battery system includes a cell stack in which a plurality of battery cells are stacked; a module case accommodating the cell stack therein; and at least one blocking member interposed between the plurality of battery cells, wherein the blocking member is elastically deformed by pressure applied by a battery cell of the plurality of battery cells, when the battery cell expands, to protrude at least a portion of the blocking member out of the cell stack.

The module case may include at least one insertion groove into which a portion of the blocking member protruding to the outside of the cell stack is inserted.

A cross-section of the blocking member may be formed to have a shape in which a curve is repeated.

The blocking member may have a cross-section formed in a waveform shape.

The blocking member may include mica.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
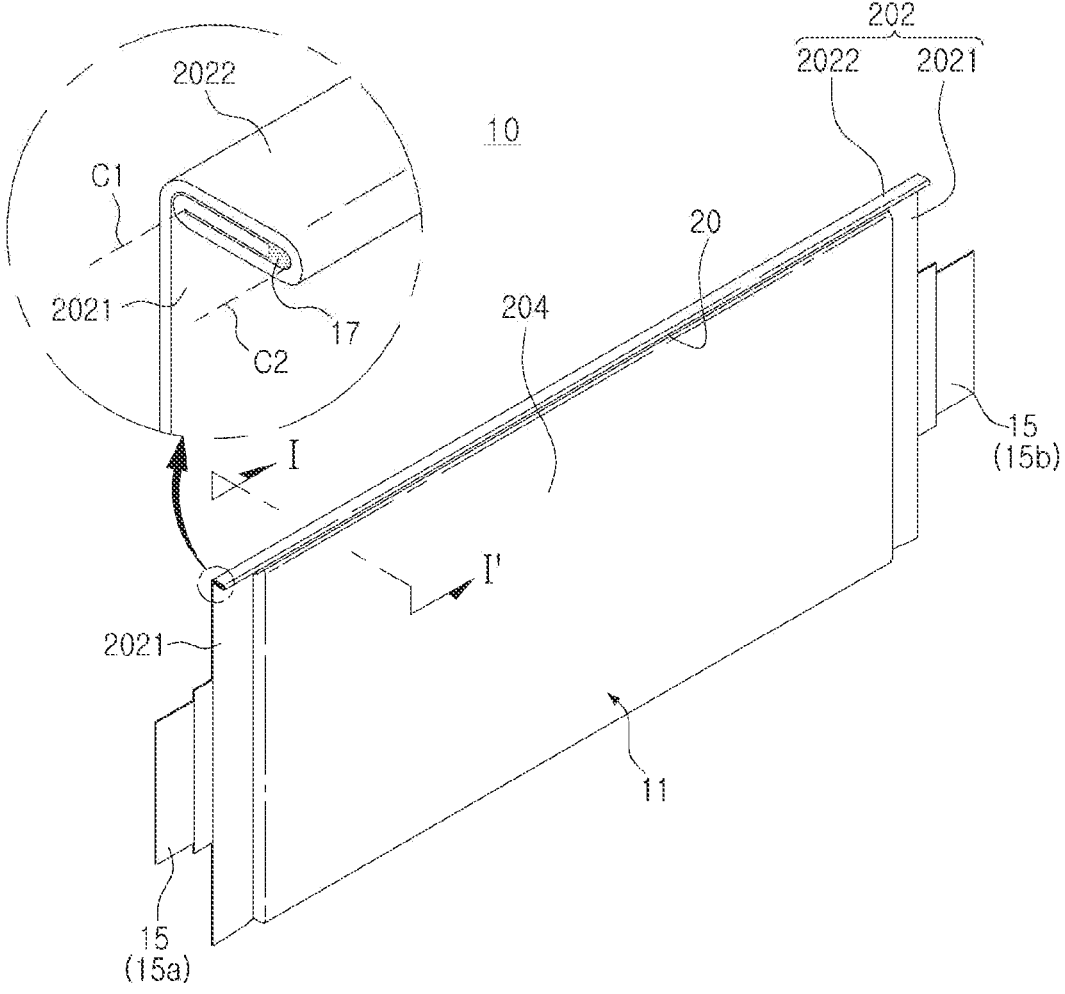
FIG. 1 is a perspective view of a battery cell according to an embodiment of the present disclosure.

Prior to the detailed description of the present disclosure, terms or words used in the specification and claims, described below, should not be construed as being limited to ordinary or dictionary meanings, and the inventors should develop their own inventions in the best possible manner. It should be interpreted as having a meaning and concept consistent with the technical idea of the present disclosure, based on the principle that it may be appropriately defined as a concept of a term for explanation. Therefore, it should be understood that since embodiments described in the specification and configurations illustrated in the drawings may be only the most preferred embodiments of the present disclosure, and do not represent all of the technical ideas of the present disclosure, there may be various equivalents and variations to be replaced at the time of filing the present disclosure.

Hereinafter, preferred embodiments of the present disclosure will be described in detail with reference to the accompanying drawings. In this case, it should be noted that the same components in the accompanying drawings are denoted by the same reference numerals as much as possible. In addition, detailed descriptions of well-known functions and configurations that may obscure the gist of the present disclosure will be omitted. For the same reason, some components may be exaggerated, omitted, or schematically illustrated in the accompanying drawings, and a size of each of the components may not fully reflect an actual size thereof.

For example, in this specification, expressions such as an upper side, an upper portion, on, a lower side, a lower portion, below, a side surface, and the like are described based on the drawings, and it is made clear in advance that they may be expressed differently when a direction of an object of interest is changed.

A battery system described below may include a battery module, a battery pack, an energy storage system, or the like in which a plurality of battery cells are mounted in a battery cell case. In the following embodiments, a battery module will be described as an example.

FIG. 1 is a perspective view of a battery cell according to an embodiment of the present disclosure.

Referring to FIG. 1, a battery cell 10 according to the present embodiment may include an electrode assembly and a battery cell case 11 accommodating the electrode assembly.

A battery cell 10 according to the present embodiment may include a lithium secondary battery, as a secondary battery capable of charging and discharging. The lithium secondary battery may be formed as a flexible pouch-type battery cell or a rigid prismatic-type battery cell. Hereinafter, a pouch-type battery cell will be described as an example, but a configuration of the present disclosure is not limited thereto, and may be easily applied to a prismatic-type battery cell.

The battery cell case 11 may form an exterior of the battery cell 10, and may protect components accommodated therein from an external environment. An exterior material having a film form in which a surface of a metal thin film is insulated may be used as the battery cell case 11. The metal thin film may be formed of aluminum, and the insulation may include applying modified polypropylene, which is a polymer resin, such as cast polypropylene (CPP) to form a heat-sealed layer, and forming a resin material such as nylon or polyethylene terephthalate (PET) on an outer side surface thereof.

In the present embodiment, the battery cell case 11 may be prepared by forming a single sheet of exterior material. Therefore, after forming at least one accommodation space in the exterior material, the battery cell case 11 may be completed by folding the exterior material to form the accommodation spaces as one space.

An accommodation space in which an electrode assembly (not illustrated) is accommodated may be provided in the battery cell case 11. Also, an electrode lead 15 may protrude from the battery cell case 11.

The electrode assembly, together with an electrolyte, may be accommodated in the accommodation space of the battery cell case 11.

A battery cell case 11 of the present embodiment may be completed by folding the exterior material, joining adjacent edge portions, and then sealing the accommodation space. A thermal fusion method may be used as a method of joining the edge portions, but the present disclosure is not limited thereto. Hereinafter, a portion in which the electrode assembly and the electrolyte are accommodated may be referred to as an accommodation portion 204, and an edge portion in which the exterior material is joined may be referred to as a sealed portion 202.

The sealed portion 202 may be prepared to form a flange extending from the accommodation portion 204 externally, and thus the sealed portion 202 may be disposed along an outer edge 20 of the accommodation portion 204.

In the present embodiment, the sealed portion 202 may be divided into a first sealed portion 2021 in which the electrode lead 15 is disposed, and a second sealed portion 2022 in which the electrode lead 15 is not disposed.

In the present embodiment, after forming a single sheet of the exterior material, the exterior material may be folded to form the battery cell case 11. Therefore, there may be no need to form the sealed portion 202 on a surface (a lower surface in FIG. 1) on which the exterior material are folded. Therefore, in the present embodiment, the sealed portion 202 may be formed on the outer edge of the accommodation portion 204, may be provided only on three of four surfaces forming the accommodation portion 204 in the thickness direction, and no sealed portion may be formed on one remaining surface (the lower surface in FIG. 1). The configuration of the present disclosure is not limited thereto, and it may be also possible to form a sealed portion on all four surfaces forming a thickness direction of the accommodation portion 204, as needed.

In addition, in a battery cell 10 of the present embodiment, the sealed portion 202 may be configured in a folded form at least once, to increase junction reliability of the sealed portion 202, and minimize an area of the sealed portion 202.

More specifically, in a sealed portion 202 of the present embodiment, the second sealed portion 2022 on which the electrode lead 15 is not disposed may be fixed after being folded twice.

For example, the second sealed portion 2022 may be folded by 180 degrees along a first bending line C1 and a second bending line C2, illustrated in FIG. 1, and may then be closely fixed to the accommodation portion 204.

In this case, an adhesive member 17 may be filled in the second sealed portion 2022, and thus the second sealed portion 2022 may be maintained to have a folded shape by the adhesive member 17. The adhesive member 17 may be formed of an adhesive having a high thermal conductivity. For example, the adhesive member 17 may be formed of epoxy or silicone, but the present disclosure is not limited thereto.

In the present embodiment, the electrode lead 15 may include a positive electrode lead 15*a* and a negative electrode lead 15*b*. The positive electrode lead 15*a* and the negative electrode lead 15*b* may be respectively connected to the electrode assembly, and may be formed of a plate-shaped metal. For example, the positive electrode lead 15*a* may be formed of an aluminum (Al) material, and the negative electrode lead 15*b* may be formed of a copper (Cu) material. However, the present disclosure is not limited thereto.

In the present embodiment, the positive electrode lead 15*a* and the negative electrode lead 15*b* may be arranged to face each other in opposite directions. However, a configuration of the present disclosure is not limited thereto, and various modifications may be performed as needed, such as arranging the positive electrode lead 15*a* and the negative electrode lead 15*b* to face in the same direction.

Figure 2:
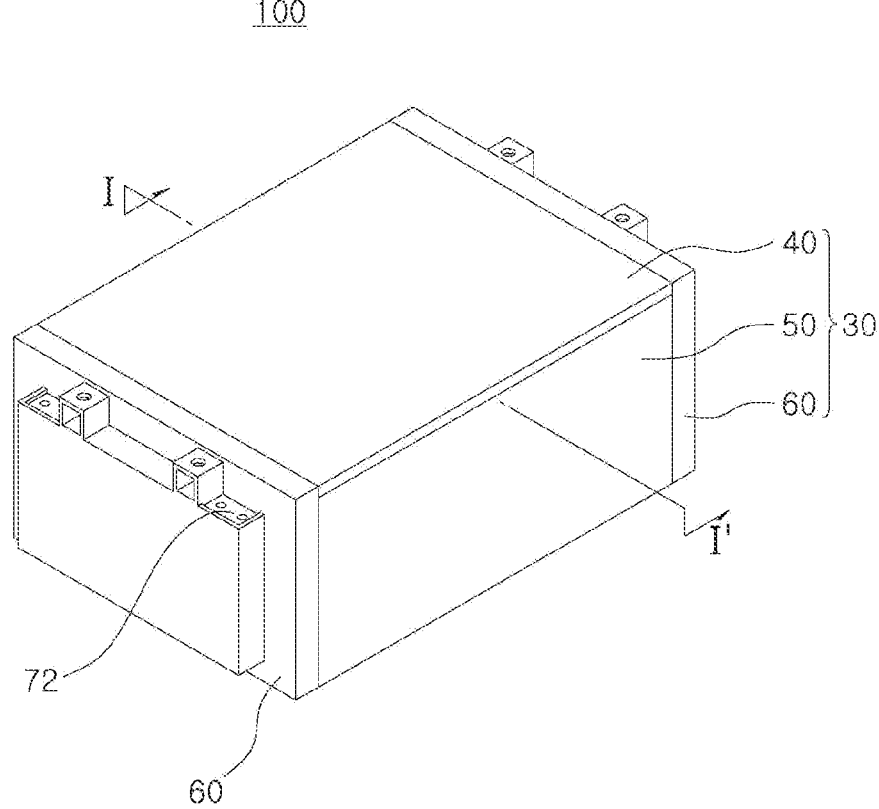
FIG. 2 is a perspective view schematically illustrating a battery module according to an embodiment of the present disclosure.
Figure 3:
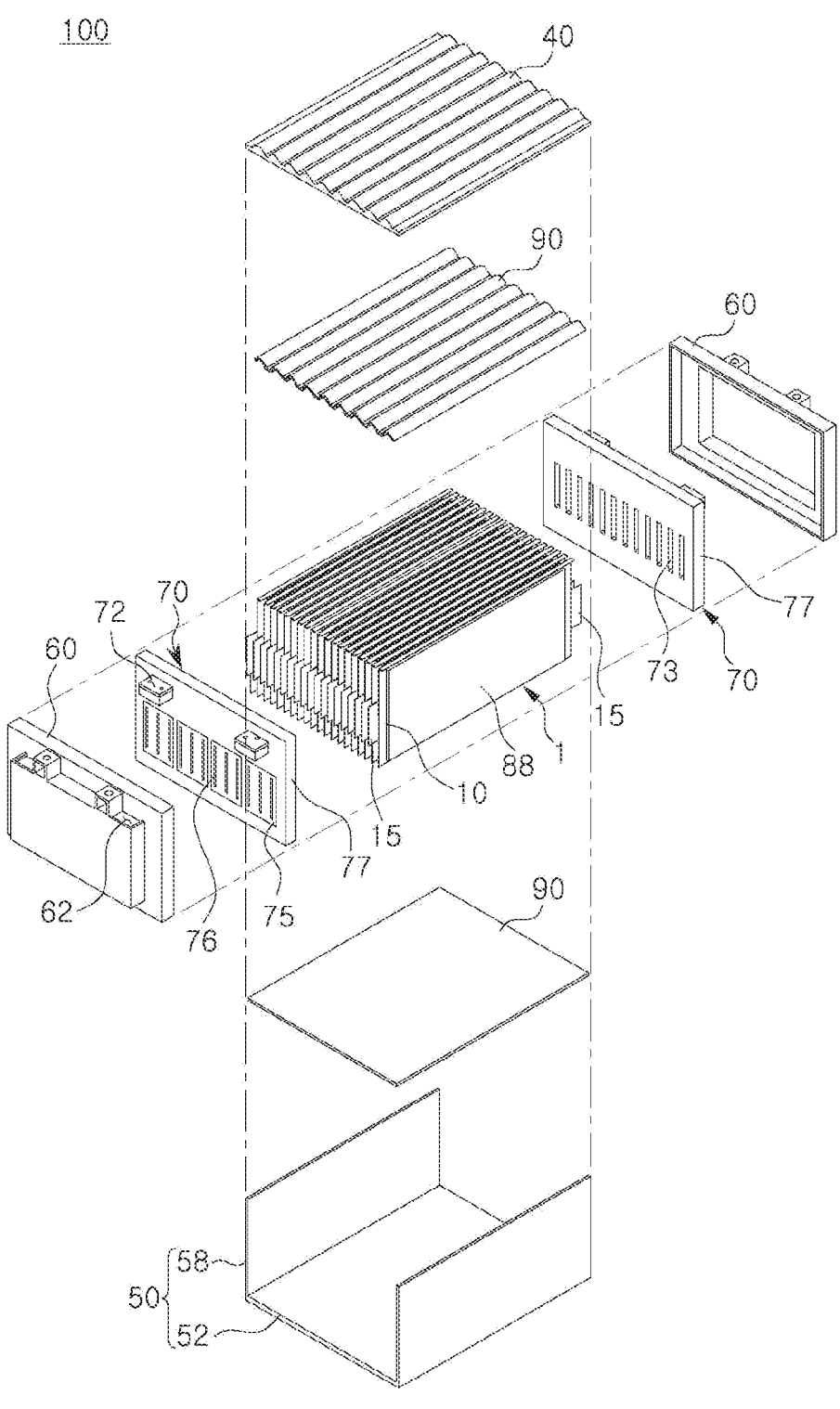
FIG. 3 is an exploded perspective view of FIG. 2.
Figure 4:
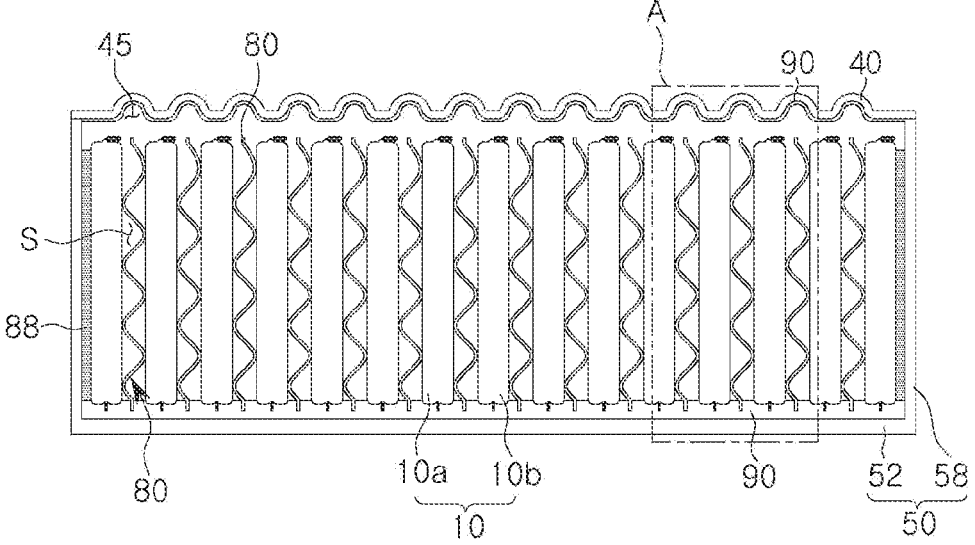
FIG. 4 is a cross-sectional view of FIG. 2, taken along line I-I'.

FIG. 2 is a perspective view schematically illustrating a battery module according to an embodiment of the present disclosure, FIG. 3 is an exploded perspective view of FIG. 2, and FIG. 4 is a cross-sectional view of FIG. 2, taken along line I-I'.

Referring to FIGS. 2 to 4, a battery module 100 of the present embodiment may include a cell stack 1 in which a plurality of battery cells 10, as described above, are stacked, a module case 30, a bus bar assembly 70, and a blocking member 80.

The cell stack 1 may include a plurality of battery cells 10. For example, the cell stack 1 may be formed by stacking the plurality of battery cells 10, as illustrated in FIG. 1, in a thickness direction.

In the present embodiment, the battery cells 10 are illustrated to be stacked and arranged in left and right directions (or in a horizontal direction), may be also stacked and arranged in a vertical direction, as necessary.

The module case 30 may accommodate the cell stack 1 therein. Therefore, the module case 30 may define an exterior of the battery module 100, and may protect the battery cells 10 from an external environment.

A module case 30 of the present embodiment may include a first plate 50 disposed on one side of the cell stack 1, a second plate 40 disposed on the other side of the cell stack 1, and a side cover 60 disposed on side surfaces of the battery cells 10 on which electrode leads 15 are arranged.

The first plate 50 may include a lower plate 52 disposed below the cell stack 1 to support a lower surface of the cell stack 1, and a side plate 58 supporting a side surface of the cell stack 1.

In the present embodiment, the lower plate 52 and the side plate 58 may be formed by bending one plate-like member. A configuration of the present disclosure is not limited thereto, and it is also possible to configure the side plate 58 and the lower plate 52 as independent components, as necessary.

The lower plate 52 may form a bottom surface of the battery module 100. Therefore, the lower plate 52 may be formed in a flat shape.

The side plates 58 may be formed to extend from both sides of the lower plate 52 to support the cell stack 1.

The first plate 50 may be formed of a material having high thermal conductivity such as metal. For example, the first plate 50 may be formed of aluminum, but the present disclosure is not limited thereto, and even if not metal, various materials may be used as long as they have similar strength and thermal conductivity.

The second plate 40 (or an upper plate) may be disposed on the battery cell 10, and coupled to an upper surface of the cell stack 1. Also, the second plate 40 may be fastened to an upper end of the side plate 58 of the first plate 50.

Like the first plate 50, the second plate 40 may be formed of a material having high thermal conductivity such as metal. For example, the second plate 40 may be formed of aluminum, but the present disclosure is not limited thereto, and even though not metal, various materials may be used as long as they have similar strength and thermal conductivity.

The first plate 50 and the second plate 40 may be coupled by welding or the like. Various modifications are possible as needed, such as coupling in a sliding manner, or coupling using a fixing member such as a bolt, a screw, or the like.

In addition, a plurality of insertion grooves 45 may be formed on one surface of the second plate 40 facing the cell stack 1 in the present embodiment.

A blocking member 80 to be described below may be inserted into the insertion grooves 45. Therefore, the insertion grooves 45 may be formed in a position facing the blocking member 80 on the one surface of the second plate 40 described above. Therefore, the plurality of insertion grooves 45 may be provided to correspond to the number of blocking members 80.

Figure 7:
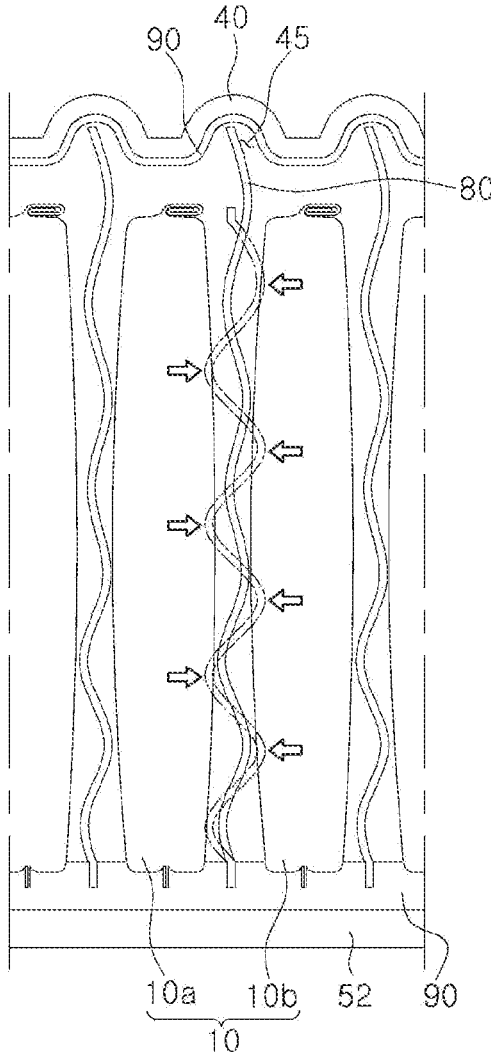

When the battery module 100 operates normally, the insertion groove 45 may remain empty. As illustrated in FIG. 7, when the blocking member 80 is elastically deformed, a portion of the blocking member 80 protruding upwardly from the cell stack 1 may be inserted into the insertion groove 45. In the present embodiment, the same number of insertion grooves 45 as the number of blocking members 80 may be formed. A configuration of the present disclosure is not limited thereto. For example, as in an embodiment described later, a size of the insertion groove 45 may be also changed such that a plurality of blocking members 80 may be inserted into one insertion groove 45.

The side cover 60 may be coupled to both side surfaces of the battery cells 10 on which the electrode leads 15 are arranged.

The side cover 60 may be coupled to the first plate 50 and the second plate 40 through a fixing member such as a screw or a bolt. The present disclosure is not limited thereto, and they may be coupled through a method such as welding.

The side cover 60 may be formed of an insulating material such as a resin, and may have a through-hole 62 for exposing a connection terminal 72 externally.

A bus bar assembly 70 may be interposed between the side cover 60 and the cell stack 1.

The bus bar assembly 70 may be disposed on side surfaces of the battery cells 10 on which the electrode leads 15 are arranged, may be coupled to the cell stack 1, and may include at least one bus bar 75 and at least one insulating cover 77.

The insulating cover 77 may be combined with the bus bar 75 to form an overall exterior of the bus bar assembly 70. The insulating cover 77 may be formed of an insulating material, and at least a portion of the bus bar 75 may be buried in the insulating cover 77 or joined to the insulating cover 77.

The insulating cover 77 may be provided with a plurality of through-holes 7673 into which the electrode leads 15 are inserted and arranged. In addition, a connection terminal 72 for electrically connecting the battery cells 10 to an external source may be provided on the insulating cover 77.

The connection terminal 72 may be exposed externally through a through-hole 62 formed in the side cover 60. Therefore, the through-hole 62 of the side cover 60 may be formed to have a shape corresponding to a size and a shape of the connection terminal 72.

In the present embodiment, the connection terminal 72 may be formed of a conductive member, and may be electrically connected to the bus bar 75, or may be joined to at least one bus bar 75.

The bus bar 75 may be formed in a form of a metal plate, and may be coupled to an outer surface of the insulating cover 77. The battery cells 10 may be electrically connected to each other by the bus bar 75, and may be electrically connected to external components of the battery module 100 through the bus bar 75 and the connection terminal 72.

To this end, the bus bar 75 may be provided with a plurality of through-holes 76 into which the electrode leads 15 are inserted, and the electrode leads 15 may be inserted through the through-holes 76 of the bus bar 75, and may be then joined to the bus bar 75 by a method such as welding or the like. Therefore, at least a portion of an end of the electrode lead 15 may completely penetrate the bus bar 75, and be exposed out of the bus bar 75.

A heat transfer member 90 may be disposed in at least one of between the cell stack 1 and the first plate 50 or between the cell stack 1 and the second plate 40.

The heat transfer member 90 may transfer heat generated from the battery cell 10 to the module case 30. To this end, the heat transfer member 90 may be formed of a material having a high thermal conductivity. For example, the heat transfer member 90 may be formed in at least one form selected from the group consisting of a thermal grease, a thermal adhesive such as a thermally conductive epoxy resin, and a heat dissipation pad such as a heat dissipation silicone pad, but the present disclosure is not limited thereto.

The heat transfer member 90 may be disposed on an inner surface of the module case 30 as a pad form, or may be applied to the inner surface of the module case 30 as a liquid state or a gel state. A heat transfer member 90 of the present embodiment may have high insulation, and, for example, a material having a dielectric strength of 10 to 30 KV/mm may be used.

Therefore, in the battery module 100 according to the present embodiment, even though insulation is partially broken in the battery cell 10, electrical insulation between the battery cell 10 and the module case 30 may be maintained by the heat transfer member 90 disposed around the battery cell 10.

In addition, since the heat transfer member 90 may be disposed to fill a space between the battery cell 10 and the module case 30, overall rigidity of the battery module 100 may be reinforced.

In addition, a battery module 100 of the present embodiment may include at least one blocking member 80.

The blocking member 80 may be provided to block propagation of flame or heat, due to the flame, to other battery cells 10, when a flame may be generated in one battery cell 10.

In general, in a battery cell, an abnormality may occur in the range of about 150° C. to 200° C., and gas may be generated at 300° C. or higher. Therefore, a blocking member of the present embodiment may be formed of a material that does not melt or break at 300° C. or less.

The blocking member 80 may be formed of a flame retardant material, a non-combustible material, or a fireproof insulating material. In the present embodiment, a blocking member may be formed of an inorganic material, and may be formed as, for example, a sheet containing mica.

Mica, as one of rock forming materials constituting granite, may have excellent electrical insulation, and may have very little change in property when heated. The mica may have an insulation resistance maintained at about 150 kV/mm even at a high temperature of 500 to 1000° C. to have excellent flame retardancy, and may not emit smoke during combustion or heating. Due to these characteristics, transfer of heat or flame between adjacent battery cells 10 may be prevented by inserting the blocking member 80 including the mica between the battery cells 10.

In addition, a blocking member 80 of the present embodiment may be elastically deformed to have a shape in which a curve is straightened, by pressure applied by the battery cell 10. When the blocking member 80 is entirely formed of an inorganic material such as mica, it may be difficult to apply an elastic force to the blocking member 80. Therefore, a blocking member 80 of the present embodiment may be formed of a sheet having a uniform thickness manufactured using mica, and may be manufactured with a composition containing mica as a main component and a small amount of a binder.

Muscovite mica or phlogopite mica may be used as the mica, or a mixture thereof may be used. A binder component is not particularly limited, and any organic or inorganic binder having heat resistance while binding mica particles to maintain a sheet shape may be suitably used. For example, the blocking member 80 may include the binder in an amount of 1 to 10% by weight, and may include the mica in an amount of 90% by weight or more.

In the present embodiment, a silicone resin having high heat resistance may be used as the binder. A configuration of the present disclosure is not limited thereto, and various modifications are possible, such as forming a base substrate with silicon and joining mica particles to both side surfaces of the base substrate to form a blocking member. In addition, a material of a blocking member 80 of the present disclosure is not limited to the above materials, and may be used in various manners as long as it does not melt or break at 300° C. or less, and provides elasticity.

For example, the blocking member 80 may be formed of a material containing ceramic or silicon for fire resistance/ insulation, a material having a pad shape made by coating or using a gel-type heat insulating material including sodium silicate on a thin film, or a fibrous fireproof insulation material, such as ceramic wool or glass fiber, having flame retardant properties.

In addition, the blocking member 80 may be formed of a rubber material including ceramic with thermal insulation performance, or the blocking member 80 may be formed of a rubber material containing expandable graphite, such that when exposed to heat, the graphite rapidly expands to form a heat insulating layer.

In addition, a blocking member 80 of the present embodiment may be formed to be curved, and a cross-section may be formed to have a wave shape in which a curve is repeated. Therefore, both surfaces of the blocking member 80 may be configured to partially contact the battery cells 10 facing each other.

Figure 5:
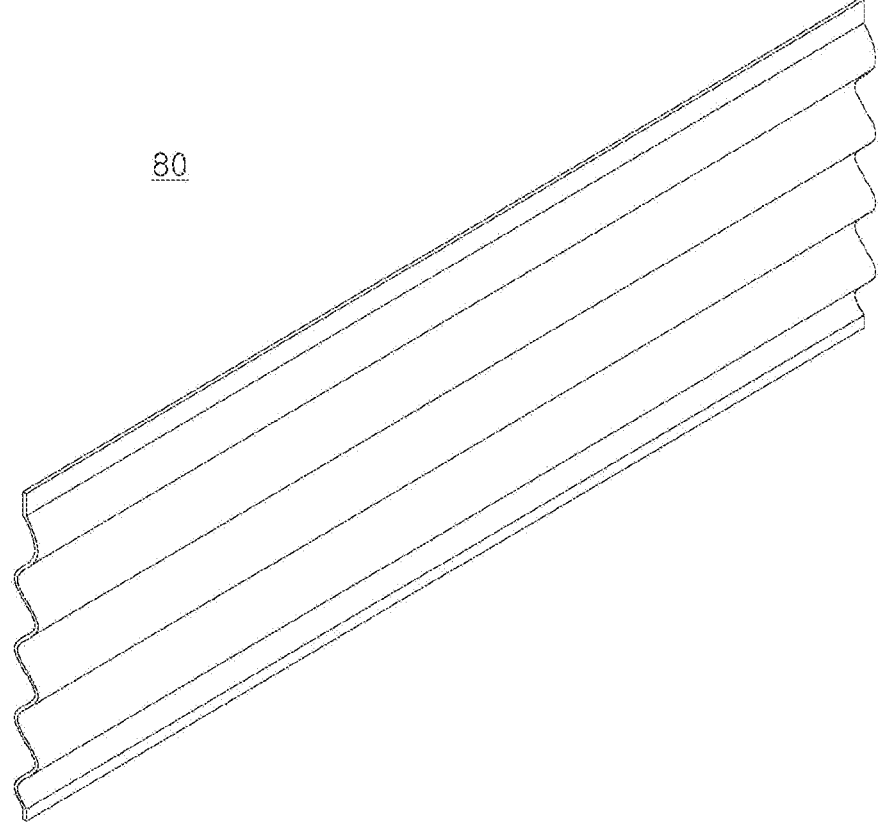
FIG. 5 is a perspective view of the blocking member illustrated in FIG. 4.
Figure 6:
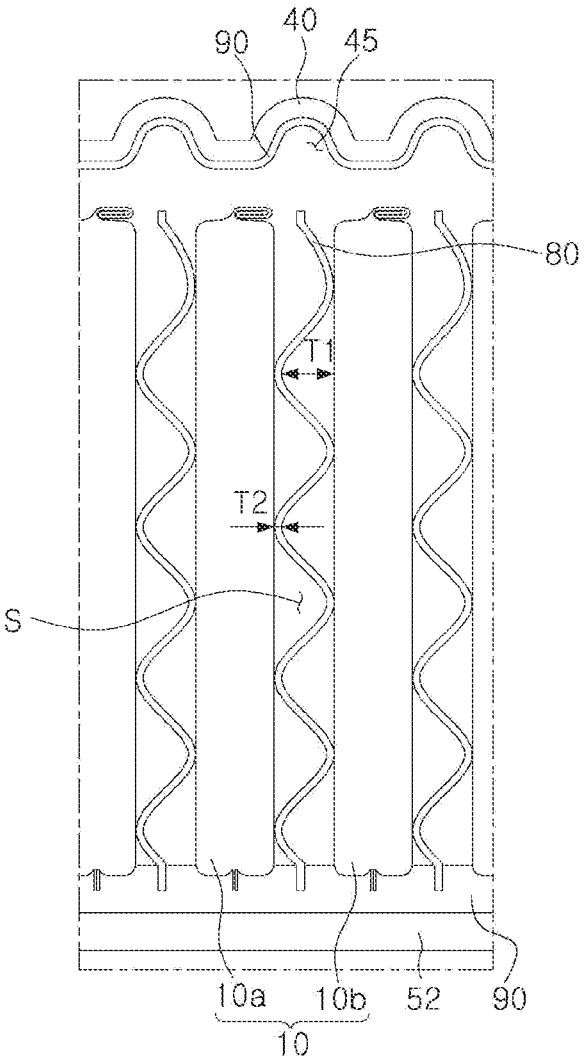
FIGS. 6 and 7 are enlarged views of portion A of FIG. 4.

FIG. 5 is a perspective view of the blocking member illustrated in FIG. 4, and FIG. 6 is an enlarged view of portion A of FIG. 4.

Referring to FIGS. 5 and 6 together, a blocking member 80 of the present embodiment may have a cross-section formed in a sine wave shape. Therefore, if battery cells 10 disposed on both surfaces of the blocking member 80 are classified as a first cell 10*a* and a second cell 10*b*, respectively, the blocking member 80 may alternately contact the first cell 10*a* and the second cell 10*b*, depending on a shape of the cross-section, described above.

Also, due to a shape of the cross-section, described above, an air insulation layer S may be formed between the blocking member 80 and the battery cell 10. A portion of the blocking member 80 contacting the first cell 10*a* may be spaced apart from the second cell 10*b*, and thus an air insulation layer S may be formed between the blocking member 80 and the second cell 10*b*. Similarly, an air insulating layer S may be formed between the first cell 10*a* and a portion of the blocking member 80 contacting the second cell 10*b*.

A configuration of the blocking member 80 in the form of a flat plate without a curve may also be considered. In this case, since only the blocking member 80 is disposed between two battery cells 10 adjacent to each other, there may be a limit to improving insulation performance.

In a battery module 100 of the present embodiment, the blocking member 80 and the air insulation layer S may be disposed together between two battery cells 10 adjacent to each other. Air may provide very good insulation performance. Therefore, when the blocking member 80 and the air insulation layer S are provided together, as in the present embodiment, very high insulation performance may be provided.

In addition, a blocking member 80 of the present embodiment may be elastically deformed due to the shape, when the battery cell 10 expands.

FIG. 7 is an enlarged view of portion A of FIG. 4, illustrating a battery cell in an expanded state.

Referring to FIG. 7 together, when a battery cell 10 expands due to a battery swelling phenomenon or the like, a blocking member 80 of the present embodiment may be elastically deformed to have a shape in which a curve is straightened, by pressure applied by the battery cell 10.

In this process, a volume of an air insulation layer S formed between the blocking member 80 and the battery cell 10 may be reduced, and the battery cell 10 may be disposed in an expanded region by as much as the reduced volume.

For example, a battery cell 10 of the present embodiment may be expanded by a volume formed by the air insulation layer S. Therefore, a total volume of the air insulation layer S may be defined in consideration of a degree of expansion of the battery cell 10.

Through this configuration, a battery module 100 of the present embodiment may minimize an increase in total volume of a cell stack 1, even though a volume of the battery cell 10 increases due to a battery swelling phenomenon.

Unlike the present embodiment, a configuration of a blocking member 80 to have a structure that may not be elastically deformed (for example, a flat plate structure) may be considered. In this case, when a battery cell 10 expands, a space capable of accommodating an increased volume of a cell stack 1 should be provided. In general, a compressible pad member (e.g., a foamed pad or the like) may be disposed between battery cells to accommodate an increased volume of a battery cell 10 due to a swelling phenomenon.

Therefore, when the blocking member 80 is not elastically deformed, it may be necessary to additionally dispose a pad member between the blocking member 80 and the battery cell. In this case, there may be problems in that a manufacturing process is complicated and manufacturing costs may also increase.

A battery module 100 of the present embodiment, as described above, may provide a space capable of accommodating an increased volume of a cell stack 1 only with a blocking member without a pad member, and, at the same time, may also provide high insulation performance using an air insulation layer. Therefore, since the pad member may be omitted, a manufacturing process may be simplified and a manufacturing cost may be reduced.

Also, a blocking member 80 of the present embodiment may be disposed to contact a heat transfer member 90, as described above. For example, one side of the blocking member 80 facing the lower plate 52 may be inserted into the heat transfer member 90. Therefore, when the heat transfer member 90 is cured, the blocking member 80 may be fixedly coupled to the heat transfer member 90.

In this case, when the blocking member 80 is elastically deformed, as described above, the blocking member 80 may expand toward the upper plate 40, and thus a portion of the blocking member 80 protruding out of the cell stack 1 may be inserted into an insertion groove 45 provided on one surface of the second plate 40.

Referring to FIG. 6, when a thickness T2 of the blocking member 80 is excessively thin, a thermal blocking effect may be reduced. In a blocking member 80 including mica, it was confirmed that propagation of flame or heat was effectively blocked at a thickness of 0.7 mm or more, through various experiments. Therefore, a blocking member 80 of the present embodiment may have a thickness T2 of 0.7 mm or more.

Also, when a thickness T1 of the air insulation layer S is excessively thin, a space in which the battery cell 10 expands may be narrow. Thus, in the present embodiment, the maximum thickness T1 of the air insulation layer S may be formed to be thicker than the thickness T2 of the blocking member 80. For example, the maximum thickness T1 of the air insulation layer S may be formed to be twice or more than the thickness T2 of the blocking member 80. In this case, the thickness T1 of the air insulation layer S may be defined as a maximum separation distance between the battery cell 10 and the blocking member 80 in a stacking direction of the battery cell 10 (or in a thickness direction of the battery cell).

As illustrated in FIG. 4, a buffer pad 88 may be disposed between the cell stack 1 and the side plate 58. Similar to the blocking member 80, the buffer pad 88 may be elastically deformed in a compressed form by pressure applied by the battery cell 10, when the battery cell 10 expands.

Therefore, the buffer pad 88 may be formed in a form of elastically compressed foam in response to expansion of the battery cell 10, and may be formed of any one material of polyethylene, polypropylene, or polyurethane. The present disclosure is not limited thereto. It is also possible to dispose a blocking member 80, as described above, instead of the buffer pad 88.

A battery module 100 according to the present embodiment, configured as described above, may suppress propagation of flame or heat, caused by the flame, in a battery cell 10 to the other battery cell 10 through a blocking member 80. In addition, when a volume of the battery cell 10 expands, a blocking member 80 may be elastically deformed, and a space in which the battery cell 10 may expand may be provided. Therefore, it is possible to prevent damage to the battery module 100 or occurrence of additional problems due to expansion of the battery cell 10.

The present disclosure is not limited to the above-described embodiments, and various modifications are possible.

Figure 8:
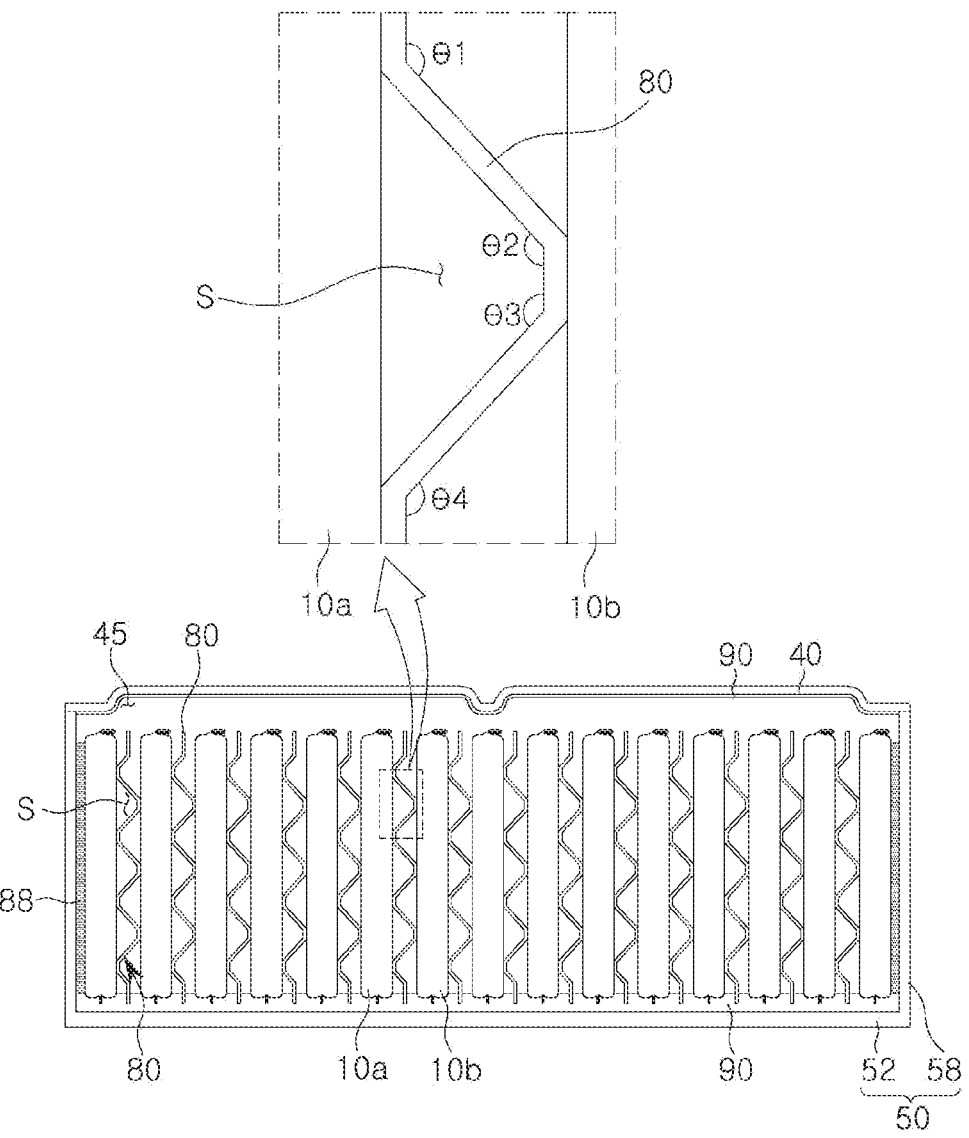
FIG. 8 is a cross-sectional view of a battery module according to another embodiment of the present disclosure.

FIG. 8 is a cross-sectional view of a battery module according to another embodiment of the present disclosure, illustrating a cross-section corresponding to FIG. 4.

Referring to FIG. 8, a battery module according to the present embodiment may have a cross-section formed in a square wave shape. Therefore, a contact area between a blocking member 80 and a battery cell 10 may increase, compared to the above-described embodiments.

As described above, a blocking member 80 of the present disclosure should be configured to straighten a curve, when a battery cell 10 expands. To this end, based on the cross-section illustrated in FIG. 7, a blocking member 80 of the present embodiment may be formed such that all bent portions θ1, θ2, θ3, and θ4 have an obtuse angle, respectively.

In the present embodiment, θ1 and θ4 may be formed to have the same angle, and θ2 and θ3 may be also formed to have the same angle. The present disclosure is not limited thereto.

In addition, each embodiment may be implemented in combination with each other.

While example embodiments have been illustrated and described above, it will be apparent to those skilled in the art that modifications and variations could be made without departing from the scope of the present disclosure as defined by the appended claims.

What is claimed is:

1. A battery system comprising:
a cell stack in which a plurality of battery cells are stacked;
a module case accommodating the cell stack therein; and
at least one blocking member interposed between the plurality of battery cells,
wherein the at least one blocking member is formed of a material that does not melt at 300° C. or less, and
a cross-section of the at least one blocking member is formed to have a shape in which a curve is repeated,
wherein the at least one blocking member is elastically deformable and has a cross-section formed in a sine wave shape such that all bent portions have an obtuse angle.

2. The battery system of claim 1, wherein the at least one blocking member is elastically deformed by pressure applied by a battery cell of the plurality of battery cells, when the battery cell expands, to protrude at least a portion of the at least one blocking member out of the cell stack.

3. The battery system of claim 2, wherein the module case comprises an upper plate disposed on the cell stack,
wherein the upper plate has at least one insertion groove into which a portion protruding out of the cell stack is inserted, when the at least one blocking member is elastically deformed.

4. The battery system of claim 3, wherein the insertion groove is formed to face the at least one blocking member, and one or more of the at least one blocking members are inserted into one insertion groove.

5. The battery system of claim 1, wherein a plurality of air insulation layers are provided between a battery cell of the plurality of battery cells and the at least one blocking member, facing each other.

6. The battery system of claim 1 further comprising a heat transfer member disposed between the module case and the cell stack,
wherein at least a portion of the at least one blocking member is inserted into the heat transfer member.

7. The battery system of claim 6, wherein the heat transfer member is formed from at least one selected from the group consisting of thermal grease, a thermally conductive adhesive, and a heat dissipation pad.

8. The battery system of claim 1, wherein the at least one blocking member comprises mica.

9. The battery system of claim 8, wherein the at least one blocking member is formed by mixing a mica particle and a silicone resin.

10. A battery system comprising:
a cell stack in which a plurality of battery cells are stacked;
a module case accommodating the cell stack therein; and
at least one blocking member interposed between the plurality of battery cells,
wherein the at least one blocking member is elastically deformed by pressure applied by a battery cell of the plurality of battery cells, when the battery cell expands, to protrude at least a portion of the at least one blocking member out of the cell stack,
wherein the module case comprises at least one insertion groove into which a portion of the at least one blocking member protruding outside of the cell stack is inserted.

11. The battery system of claim 10, wherein a cross-section of the at least one blocking member is formed to have a shape in which a curve is repeated.

12. The battery system of claim 10, wherein the at least one blocking member has a cross-section formed in a waveform shape.

13. The battery system of claim 10, wherein the at least one blocking member comprises mica.

* * * * *